Nov. 26, 1968 J. C. ARMSTRONG 3,412,824

SPEAKER CABINET ENCLOSURE

Filed Feb. 17, 1967 2 Sheets-Sheet 1

INVENTOR.
JAMES C. ARMSTRONG

BY

Pearce and Schaeperklaus

ATTORNEYS

INVENTOR.
JAMES C. ARMSTRONG

BY

Pearce and Schaeperklaus

ATTORNEYS 3,412,824
Patented Nov. 26, 1968

3,412,824

SPEAKER CABINET ENCLOSURE

James C. Armstrong, Colerain Township, Hamilton County, Ohio (4017 Springrock Drive, Cincinnati, Ohio 45239)

Filed Feb. 17, 1967, Ser. No. 616,891
13 Claims. (Cl. 181—31)

ABSTRACT OF THE DISCLOSURE

A speaker cabinet enclosure having a main resonating chamber, a speaker unit mounted therein and having its cone directed towards an opening in a wall of such enclosure, an auxiliary resonating chamber, such chambers being separated by a baffle plate, and a pair of tuning ports, each adjustable relative to the other by increasing or decreasing their respective spacial areas. The smaller of such ports is disposed in the baffle plate in distant relation to the speaker unit. The relative sizes of these tuning ports and adjustment in sizes thereof relative to each other control the efficiency and/or degree of perfection of reproduction of sound through operation of the enclosure. The size of each tuning port can be described in theoretical terms as having a plurality of "long lines" parallel to its major (or longest) axis and a plurality of "short lines" parallel to its minor axis, and is more fully and is completely described in an understandable manner in the following specification. Briefly, higher frequencies of sound resonate along the "longer lines" of a tuning port and lower frequencies of sound resonate along the "shorter lines" of a tuning port. Insulation such as fiberglass is mounted about the interior of the enclosure in accordance with description thereof in the specification. The cabinet is airtight in its formation of walls and baffle plate, ensuring proper wave propagation within the speaker enclosure resulting in faithful reproduction of sound.

BACKGROUND OF THE INVENTION

*Field of the invention*

The field of art to which the invention is most likely to pertain is generally located in the class of apparatus relating to speakers. Class 181, Acoustics, U.S. Patent Office Classification, appears to be the applicable general area of art in which the claimed subject matter of the type involved here has been classified in the past.

*Description of the prior art*

Loudspeaker apparatus, of the type involved here, are disclosed in the following U.S. Patents: Nos. 2,205,804, 2,224,919, 2,852,087, 2,971,598, and 3,072,212.

SUMMARY

An object of this invention is to provide for a novel speaker cabinet enclosure, one from which low, medium and high frequency ranges of sound are efficiently reproduced by means of an uncomplicated structure embodying four principles never before utilized in a single enclosure.

A further object of this invention is to provide for utilization of three well known principles and one new principle in and for a construction of a speaker cabinet enclosure and which have never heretofore been utilized together in one single enclosure.

Another object of this invention is to provide for a cabinet of relatively inexpensive construction.

A further object of this invention is to provide for a novel and efficient sound reproducing apparatus, and more particularly to an acoustical enclosure for speakers whereby fidelity to a degree of perfection never before attained is obtained.

Another object of this invention is to provide for resonant chambers for the faithful reproduction of sound.

Another object of this invention is to provide for a speaker enclosure in which an increased degree of efficiency in the reproduction of sounds of high, medium, and low frequency ranges is achieved.

A still further object of this invention is to provide for a speaker cabinet enclosure of a size and construction the characteristics of which are relatively simplified and uncomplicated with regard to the realization of a true reproduction of the full range of low, medium and high frequencies of sound attained, and which are otherwise attained only by cabinets of previous types having more complicated baffle and horn systems and with a greater number and variety of elements involved in their construction.

These and other objects and advantages of this invention will become more apparent by a full reading of the following description, claims appended thereto and the drawing comprising two sheets and being part of this disclosure.

DESCRIPTION OF THE PREFERRED EMBODIMENT

Figures 1, 2, 3, 4, 5:
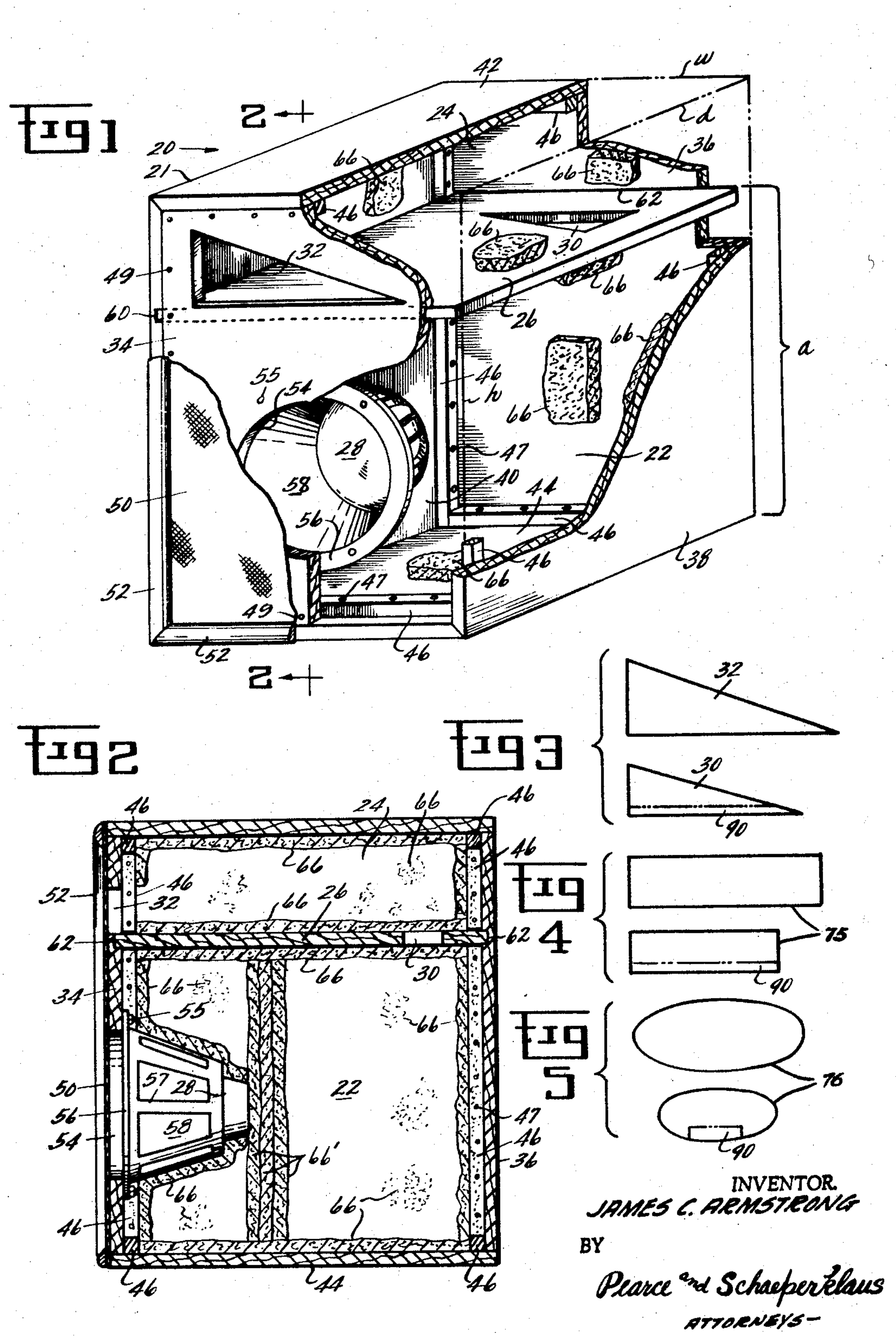
FIG. 1 is a perspective view of a speaker cabinet enclosure, broken away to show elements of the device embodying the invention.
FIG. 2 is an elevational view taken on line 2—2 of FIG. 1.
FIG. 3 is a figure showing the shape and relative sizes of tuning ports employed in the invention.
FIG. 4 is a figure showing another shape for each of a pair of tuning ports employed in the invention.
FIG. 5 is a figure of still another shape for each of a pair of tuning ports employed in the invention.
Figure 6:
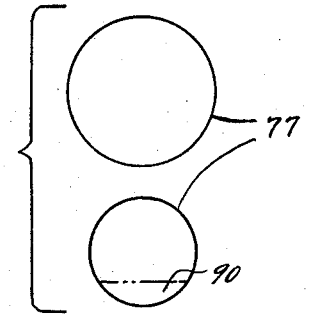
FIG. 6 is a figure of another shape for each of a pair of tuning ports employed in the invention.
Figure 8:
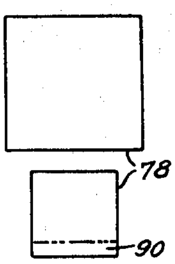
FIG. 8 is a figure of another shape for each of the pair of tuning ports employed in the invention.

Referring now to the drawing in which reference characters correspond to like numerals in the following description, 20 represents a speaker cabinet enclosure embodying the invention. Cabinet enclosure 20 comprises a cabinet 21 including a main chamber 22, an auxiliary chamber 24 of smaller volume than that of chamber 22, a baffle plate 26 separating chambers 22, 24 from each other, a speaker unit 28 disposed within main chamber 22, and a pair of tuning ports 30 and 32 providing for propagation of sound emanating in main chamber 22 and being propagated into and through auxiliary chamber 24, and therefrom into the medium surrounding the exterior of cabinet 21 and in which the hearing organ of a human being is located for the purpose of listening to faithful reproduction of sound from enclosure 20. Cabinet 21 is constructed out of thin boards, plywood, or other suitable material, and comprises a front wall 34, a rear wall 36 disposed in parallel and spaced relation to front wall 34, main chamber 22 extending from front wall 34 to rear wall 36 opposed side walls 38 and 40 disposed in parallel and spaced relationship to each other, and top and base walls 42 and 44, respectively, also in opposed and spaced relationship to each other. All of these walls are firmly secured together to form cabinet enclosure 20, as clearly shown in FIG. 1. Wooden strips 46 are securely mounted, such as by ring shank nails 47 and glue upon side, top and base walls 38, 40, 42 and 44, respectively, at a distance from the edges thereof equal to the thickness of front and rear walls 34 and 36, respectively. Front and rear walls 34, 36 are thence mounted within the respective frameworks formed by strips 46 and walls 38, 40, 42 and 44 at each end of cabinet 21, and secured to their respective cooperating wooden strips 46 by means of another set of wood screws 49. Thus, an airtight casing is assembled, with the exterior surfaces of enclosure 20 being flush one with another. A stylish grille cloth 50 may extend co-extensively over front wall 34, as is the custom in order to mask speaker unit 28, and is held thereto by means such as tacks such that a plurality of molding strip frame elements 52 mounted on the face of enclosure 20 for appearance purposes covers same.

The geometrical configuration of each chamber 22, 24 is that of a rectangular parallelepiped, as shown in FIGS. 1 and 2. And in particular, the portion of wall 34 forming auxiliary chamber 24 and in which port 32 is mounted is substantially perpendicular to baffle plate 26 which constitutes one of the walls of auxiliary chamber 24 and which opposes and is parallel to wall 42 of auxiliary chamber 24. Port 32 is disposed in wall 34 which is at the end of auxiliary chamber 24 opposite its other end at which port 30 is mounted disposed adjacently in baffle plate 26.

A full range or co-axial speaker unit 28 is securely mounted in main chamber 22 to the interior of front wall 34 about an opening 54 therein, by suitable means such as by screws 55 securing a circular flange 56, integral with a frame 57 of and encircling the cone 58 of unit 28 thereto. Cone 58 faces opening 54 and in the case of a single speaker unit 28 being mounted in chamber 22, the axis thereof extends preferably generally through the central portion of chamber 22.

Baffle plate 26 is formed of wood and its edges along side walls 38, 40 are dove-tailed into and with a pair of grooves 60 formed in such side walls, one of which is shown in FIG. 1, thereby being supported in cabinet 21. The edges of baffle plate 26 along front and rear walls 34, 36 are supported in grooves 62 formed horizontally across such walls, Thus, main chamber 22 is sealed from auxiliary chamber 24, with the exception, of course, for port 30. A layer of insulation 66, preferably of fiberglass material, of uniform thickness, preferably 1" in thickness, is securely and co-extensively mounted, such as by tacking, along the interior of the walls of cabinet 21 as well as on each surface of baffle plate 26, with the exception of the interior surface of front wall 34. As much as four times the thickness of the uniformly thick layers of fiber glass is utilized in the interior of cabinet 21. One layer engages front wall 34 and envelopes frame 57 of speaker unit 28. One or more layers 66' of fiberglass are mounted posteriorly to speaker unit 28 vertically, that is, disposed between speaker unit 28 and port 30, as shown in FIG. 2, to control reverberation and as a partial use of the infinite baffle principle. It may be noted at this point in the description above of the assembly and construction of cabinet 21 that the excellent results in faithful reproduction of sound obtained in the operation and use of speaker enclosure 20 is not significantly weakened by a layer of fiberglass on aech surface of baffle plate 26 and which extend across tuning port 30, for the air at port 30 is sufficiently compressed to overcome any significant negative effect that is produceable by such layers over port 30. With respect to port 32 (FIGS. 1, 2), however, no fiberglass covers such port, since the fiberglass is eliminated for a short distance along the upper surface of baffle plate 26, preferably recessed to at least the inward or back side of vertically disposed securing strips 46 one of which is shown adjacent port 32 in FIG. 2.

In operation, lead wires (not shown) connected in conventional fashion to speaker unit 28 are connected to a program source such as an amplifier, tape recorder, or the like, in a customary manner, and does not constitute a part of this invention. Such wires are preferably drawn through rear wall 36 for easy accessibility thereto.

A discussion of the principles utilized in this invention now follows in preparation for a fuller understanding of the construction and operation of enclosure 20. These are the ducted port bass reflex principle, the infinite baffle principle, the folded horn principle, and the "length resonance" theory. The first three principles identified above are well known in the art, however, to my knowledge, they have never been successfully and/or efficiently combined together in a single enclosure such as 20.

Briefly, a bass reflex enclosure involves the Helmholtz resonator principle by matching the enclosure's acoustical resonance with the speaker's electro-mechanical resonance through the tuning of a single vent or port. The ducted port bass reflex enclosure utilizes the same principle advantageously in a smaller enclosure than would be otherwise demanded for equal performance. The ducted port bass reflex principle is applied through the presence of auxiliary chamber 24 which is open at the first port 32 at front wall 34 and a second port 30 in baffle plate 26 adjacent to rear wall 36.

The infinite baffle enclosure prevents cancellation of bass frequencies by completely absorbing all of the sound waves projected by the rearward movement of the speaker cone. A partial use of the infinite baffle principle is applied when layers of fiberglass insulation are mounted posteriorly of speaker unit 28 in a vertical manner coextensively with the width and height of chamber 22. Without this partial use being present, the bass frequency range would not have the clarity and fidelity of reproduction of such frequencies.

A horn projects the sound from the speaker cone into a listening area. Folded horn enclosures fold the horn to minimize size and to increase bass response. The horn principle is applied by limiting the spacial area of port 30 to a size smaller than that of the spacial area of port 32. The folded horn principle is utilized to the extent that the axis of rearward propagation of sound from speaker unit 28 is altered in direction by including auxiliary chamber 24 in cabinet 21 containing main chamber 22 and which chambers 22, 24 have communication through port 30 and through which port 30 the sound waves reproduced from rear of speaker unit 28 are propagated into chamber 24 and thence exteriorly of cabinet 21 through port 32.

The description of the "length resonance" theory, to the best of my knowledge, is novel and now follows, with the figures of the drawings being referred to for illustration and clarification of same.

The configuration or shape of the ports 70, 72 or 74 effects the frequency (pitch or c.p.s.) distribution resonated through such ports. The higher frequencies resonate through longer lengths of such ports (parallel to their X-axis) while the lower frequencies resonate through the shorter lengths of such ports (parallel to their Y-axis). This is analogous to the human ear wherein pitch is distinguished by the resonance established by each frequency with its particular length of fiber within the cochlea. For what constitutes fiber within the cochlea, the reader is referred to Synopsis of Ear, Nose, and Throat Diseases, by Ryan, Thornell and Von Leden, 2d ed. 1963, published by The C. V. Mosby Company, St. Louis (Library of Congress Catalog Card #63-13173), pp. 25-30, 33-35; and Diseases of the Nose, Throat and Ear, by Jackson and Jackson, 1945, published by W. B. Saunders Company, Philadelphia, p. 212 et seq., and p. 218 et seq., these texts being recognized and accepted as authoritative medical textbooks on the anatomy and physiology of the ear. Longer fibers resonate with the higher frequencies, and shorter fibers resonate with the lower frequencies. The triangular ports 70, 72, and 74 with a higher percentage of long and/or short lengths, having the same area as a square, widens the usable frequency range of cone speakers. Where a speaker is weak in the mid-range, however, the proper choice of port shapes, for example, circles or ovals of the proper diameter, may flatten the response to yield better overall or natural sound reproduction.

The following table is used to illustrate this principle and, for explanatory purposes, the horizontal and vertical resonating lengths through the ports 70, 72, 74 will be considered.

Figures 7, 9:
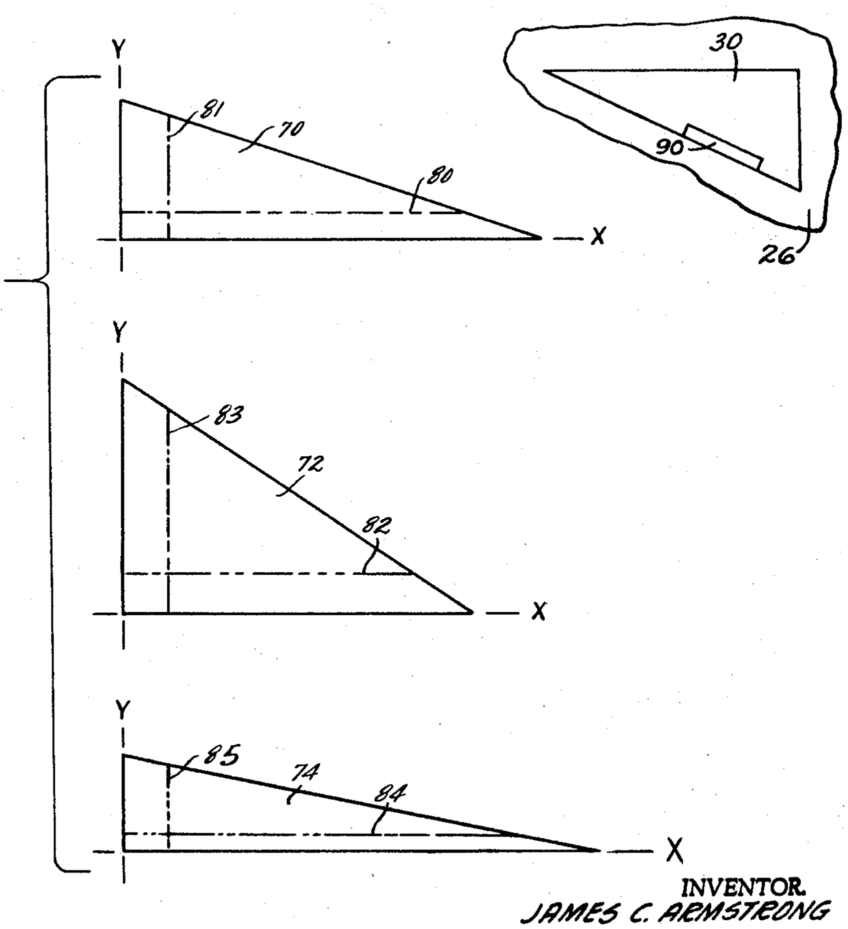
FIG. 7 is a schematic diagram of three triangles illustrating a novel principle utilized in the invention.
FIG. 9 is a plan view of a fragmentary portion of the baffle plate and tuning port therein shown in FIG. 1.

The table below compares the low and high frequency response ranges in terms of horizontal and vertical resonance lengths present in triangular openings 70, 72 and 74 in FIG. 7, all having the same spacial area. Reference characters 80, 82 and 84 represent a family of horizontal resonant lengths associated with ports 70, 72 and 74 respectively. Reference characters 81, 83 and 85 represent a family of vertical resonant lengths associated with ports 70, 72 and 74.

TABLE

| Frequency Range Resonated | Net Effect On Frequency Response By the Presence of Longer Or Shorter Resonance Lengths And the Quantities Thereof | |
|---|---|---|
| | 70 vs. 72 | 70 vs. 74 |
| Low | 70>72 | 74>70 |
| High | 70>72 | 74>70 |

In the interpretation of the above table, in the low frequency range, the family of vertical resonant lengths 81 in port 70 are generally shorter than the corresponding family of vertical lengths 83 of port 72, thereby attaining greater bass response in port 70 as opposed to port 72. Similarly, in the high frequency range, the family of horizontal resonant lengths 80 in port 70 are generally longer than the corresponding family of horizontal resonant lengths 82 of port 72, thereby attaining greater high frequency response in port 70 as opposed to port 72.

Again, in the low frequency range, the family of vertical resonant lengths 85 in port 74 are generally shorter than the corresponding family of vertical resonant lengths 81 in port 70, thereby attaining greater bass response in port 74 as opposed to port 70. Similarly, in the high frequency range, the family of horizontal resonant lengths 84 in port 74 are generally longer than the corresponding family of horizontal resonant lengths 80 in port 70, thereby attaining greater high frequency response in port 74 as opposed to port 70.

In further making enclosure 20, each port 30, 32 is made of the same size and shape. Tuning blocks 90, such as the ones shown in FIGS. 3, 4, 5, 6 and 8, are suitably secured such as by ring-shank nails to the structure forming such ports (although these figures show block 90 to be in the smaller of the respective port structures), to improve bass response. See FIG. 9 for a specific arrangement of a block 90 secured to plate 26 and in port 30. Additional tuning enlarges the spacial area of front port 32 and/or reduces the spacial area rear port 30 with the result of further increase of bass response. The best compromise made between bass response and back loading or damping of speaker cone 58 is made by changing the spacial areas of ports 30 and/or 32, to provide for bass frequency response and which also provides for greatest clarity and fidelity of reproduction.

The next step which is utilization of the fourth principle, is the changing of the configuration or shape of both ports 30, 32 to provide for the flattest overall frequency response. It should be understood and now apparent that the present preferred embodiment utilizes triangularly-shaped ports and that triangular openings 70, 72, and 74 of FIG. 7 represent and are indicative of the preferred nature of both ports 30 and 32 shown in enclosure 20 of FIGS. 1, 2 and 3. And it should be understood that this theory of "resonance lengths" is also applicable to the natures of alternate pairs of configurations, such as rectangular ports 75, oval ports 76, circular ports 77, and square ports 78 shown in FIGS. 4, 5, 6 and 8, respectively.

The above description assumes that ports 30 and 32 are initially larger in their spacial areas than is ultimately achieved through tuning. This initial spacial area can be established based on state of the art knowledge of the relationship of cabinet volumes and free air resonance characteristics for given speaker units.

Examples of dimensions of enclosure 20, characteristics for speaker units 28, volumes of main and auxiliary chambers 22, 24, and the areas and ratios thereof of back and front ports 30, 32, respectively, are as follows:

| | Dimensions (inches) See Fig. 1 | | | | Port Areas (Square Inches) | | Ratio Back(30)/ Front(32) | Speaker Unit (28) | Vertical Layers Insulation (66') Fig. 2 |
|---|---|---|---|---|---|---|---|---|---|
| | h | w | d | a | Back(30) | Front(32) | | | |
| Example: | | | | | | | | | |
| 1 | 20.00 | 14.00 | 18.00 | 14.00 | 12.50 | 14.60 | .856 | 1 J.B. Lansing D123 | 2 |
| 2 | 20.00 | 14.00 | 18.00 | 14.75 | 13.00 | 14.50 | .895 | 2 Quam 69A3 | 2 |
| 3 | 23.88 | 14.00 | 15.75 | 16.75 | 12.25 | 14.25 | .860 | 2 Quam 69A3 | 3 |
| 4 | 20.00 | 12.50 | 11.75 | 15.25 | 12.00 | 13.00 | .923 | 2 Quam 69A3 | 2 |
| 5 | 20.50 | 12.50 | 11.75 | 15.75 | 12.00 | 13.75 | .872 | 2 Quam 69C6XB | 1 |
| 6 | 26.00 | 18.50 | 18.00 | 18.50 | 15.75 | 22.50 | .700 | 1 Trusonic 150CX | 2 |

The above identified speaker units are obtainable from their respective manufacturers whose addresses are:

(a) for the Quam speakers—Quam-Nichols, Marquette Road and Prairie Ave., Chicago, Ill. 60637;

(b) for the J. B. Lansing speakers—James B. Lansing Sound, Inc., 3249 Casitas Ave., Los Angeles 39, Calif.; and (c) for the Trusonic speaker—Automatic Clerical Systems, Inc., 389 N. Fair Oaks Ave., Pasadena, Calif. 91103.

In the case of main chamber 22 having a width *w* and height *h* equated to a square, such as in Examples 1 and 6 above, auxiliary chamber 24 may be mounted on any side wall 38, 40, top 42 or base 44, and such construction embodies the invention. In the event, however, main chamber 22 does not include equal width and height dimensions, such as illustrated in Examples 2, 3, 4 and 5 above, and it is desired to mount auxiliary chamber 24 to main chamber 22 on sides other than toward top wall 42 of cabinet 21, then corresponding changes in tuning should be made in accordance with the above description concerning same.

Main chamber 22 is not limited to the inclusion of one speaker unit 28, as a plurality of such speakers, that is, full range speakers, may also be utilized in practicing the invention.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. A speaker cabinet enclosure for reproducing fidelity of sound comprising in combination, a cabinet including a front wall having an opening for a speaker unit and a rear wall parallel to said front wall, a main resonating chamber extending from the front wall to rear wall of said cabinet enclosure and formed by parallel opposing walls of said cabinet.

an auxiliary resonating chamber of smaller volume than that of said main chamber and formed by parallel opposing walls of said cabinet enclosure, a speaker unit having a cone and being mounted to said opening in said front wall and disposed in said main chamber, a baffle plate in said cabinet separating and sealing said main resonating chamber from said auxiliary chamber, said auxiliary chamber including said baffle plate as one of its walls it being parallel to an opposing wall other than said rear wall and being spaced therefrom and forming the auxiliary chamber, sound absorbing material on the interior of said walls of said cabinet for controlling sound reverberation, a pair of tuned ports, the first of said ports being mounted in said baffle plate adjacent to the rear wall opposing said front wall in which said speaker unit is mounted, the second of said ports being mounted in a cabinet wall forming said auxiliary chamber and being substantially perpendicular to said baffle plate such cabinet wall disposed at the end of said auxiliary chamber opposite the end of such chamber at which said first of said ports is disposed, and at least one layer of insulation mounted between said speaker unit and said first port and extending coextensively with the height and width of said main chamber.

2. The enclosure of claim 1 in which the configuration of each of said tuned ports is a triangle.

3. The enclosure of claim 1 in which the configuration of each of said tuned ports is rectangular.

4. The enclosure of claim 1 in which the configuration of each of said tuned ports is a square.

5. The enclosure of claim 1 in which the configuration of each of said tuned ports is oval.

6. The enclosure of claim 1 in which the configuration of each of said tuned ports is circular.

7. In a speaker cabinet enclosure for reproducing fidelity of sound and including a main resonating chamber, a speaker unit mounted in an opening in a cabinet front wall for said main chamber, an auxiliary resonating chamber, a baffle plate in said enclosure separating and sealing said main chamber from said auxiliary chamber, the baffle plate forming a wall of said auxiliary chamber, the improvement comprising a first port in said baffle plate and being disposed adjacent to the rear wall of the cabinet opposing its front wall, a second port mounted in a cabinet wall forming said auxiliary chamber and being substantially perpendicular to said baffle plate at an end thereof opposite to the end at which said first port is disposed, said first port connecting said chambers together, and at least one layer of insulation mounted between said speaker unit and said first port and extending coextensively with the height and width of said main chamber.

8. The enclosure of claim 7 in which the configuration of said port and second port is triangular.

9. The enclosure of claim 7 in which the configuration of said port and second port is rectangular.

10. The enclosure of claim 7 in which the configuration of said port and second port is square.

11. The enclosure of claim 7 in which the configuration of said port and second port is oval.

12. The enclosure of claim 7 in which the configuration of said port and second port is circular.

13. The combination of claim 7 including sound absorbing material on the interior of said walls of said enclosure for controlling sound reverberation.

References Cited

UNITED STATES PATENTS

| | | | |
|---|---|---|---|
| 1,837,755 | 12/1931 | Carlisle et al. | 181—31 |
| 2,787,332 | 4/1957 | Fulmer | 181—31 |
| 2,840,181 | 6/1958 | Wildman | 181—31 |
| 2,971,598 | 2/1961 | Sieler | 181—31 |
| 3,131,783 | 5/1964 | Mares | 181—31 |
| 3,165,587 | 1/1965 | Alderson | 179—1 |
| 2,852,087 | 9/1958 | Ruschaupt | 181—31 |

FOREIGN PATENTS

| | | |
|---|---|---|
| 102,888 | 12/1937 | Australia. |

STEPHEN J. TOMSKY, *Primary Examiner.*